United States Patent [19]

Hashimoto

[11] Patent Number: 4,491,157

[45] Date of Patent: Jan. 1, 1985

[54] VALVE ASSEMBLY FOR AIR BAG CONTROL

[75] Inventor: Nobuyuki Hashimoto, Toyota, Japan

[73] Assignee: Aisin Seiki Kabushiki Kaisha, Kariya, Japan

[21] Appl. No.: 354,375

[22] Filed: Mar. 3, 1982

[30] Foreign Application Priority Data

Mar. 6, 1981 [JP] Japan .............................. 56-30252[U]
Mar. 6, 1981 [JP] Japan .............................. 56-30253[U]

[51] Int. Cl.³ ............................................. F16K 11/14
[52] U.S. Cl. ................... 137/871; 137/596.2; 137/881; 297/284; 297/DIG. 3
[58] Field of Search .......................... 5/453, 454, 456; 297/284, DIG. 3; 128/685; 137/596.2, 871, 881

[56] References Cited

U.S. PATENT DOCUMENTS

| | | | |
|---|---|---|---|
| 2,039,638 | 5/1936 | Druge et al. ..................... | 137/871 X |
| 2,136,510 | 11/1938 | Jensen . | |
| 3,326,601 | 6/1967 | Vanderbilt et al. . | |
| 3,363,941 | 1/1968 | Wierwille . | |
| 3,784,994 | 1/1974 | Kery ............................... | 297/284 X |
| 4,073,312 | 2/1978 | Voos et al. ..................... | 137/596.2 X |
| 4,169,295 | 10/1979 | Darling ........................... | 5/453 X |
| 4,190,286 | 2/1980 | Bentley ...................... | 297/DIG. 3 X |
| 4,241,873 | 12/1980 | Satomoto ........................ | 137/550 X |

FOREIGN PATENT DOCUMENTS 1675436 12/1970 Fed. Rep. of Germany ...... 137/871

*Primary Examiner*—Gerald A. Michalsky
*Attorney, Agent, or Firm*—Burns, Doane, Swecker & Mathis

[57] ABSTRACT

An air bag control valve assembly is adapted to control the inflation of a plurality of air bags installed in a seat back rest of an automobile to fit the contour of the seated individual. The valve assembly comprises an integrally assembled body in which a pressure compartment is formed, an inlet for connecting the pressure compartment to a source of air pressure, a plurality of combined check and release valve units for connecting the pressure compartment to each of the air bags, said combined check and release valve units being attached to the interior of said body, and push-button mechanisms attached to said body to correspond to respective ones of said combined check and release valve units, the combined check and release valve units being opened by said push-button mechanisms so that air enclosed within the air bags is expelled backwardly into the pressure compartment and thence discharged into the atmosphere through gaps defined between the body and the push-button mechanisms.

5 Claims, 5 Drawing Figures

VALVE ASSEMBLY FOR AIR BAG CONTROL

BACKGROUND

This invention relates to a valve assembly, particularly to a valve assembly for controlling air bags arranged in a seat of automotive vehicles or the like.

In automotive vehicles an air bag apparatus is employed in which a plurality of air bags are installed in a seat back rest or the like so as to be individually inflated by the apparatus in order to fit them to the contour of the seated individual. The conventional valve assembly for controlling the inflation of such air bags requires a relief valve, a check valve and a filter for each air bag, wherein these components are branched about a single branching joint and connected individually to each of the air bags. This enlarges the overall dimensions of the valve assembly and complicates its structure, thereby both raising manufacturing costs and limiting the modes of attachment to the vehicle body.

SUMMARY OF THE INVENTION

The object of the present invention is to provide a valve assembly which may eliminate the aforementioned disadvantages encountered in the conventional air bag control valve assembly.

This object is attained by integrating the relief valve and check valve that have been required for each air bag, and by further combining the valves for each of the plurality of air bags.

Accordingly, the present invention provide an air bag control valve assembly for individually inflating a plurality of air bags, comprising an integrally assembled body in which a pressure compartment is formed, an inlet for connecting the pressure compartment to a source of air pressure, a plurality of combined check and release valve units for connecting the pressure compartment to each of the air bags, said inlet, said combined check and release valve units being attached to the interior of said body, and push-button mechanisms attached to said body to correspond to respective ones of said combined check and release valve units, the combined check and release valve units being opened by said push-button mechanisms so that air enclosed within the air bags is expelled backwardly into the pressure compartment and thence discharged into the atmosphere through gaps defined between the body and the push-button mechanisms.

The present invention further provides an assembly as hereinabove mentioned wherein the assembly comprises further a relief valve for releasing air from the pressure compartment to the atmosphere, said relief valve comprises a push button projecting from the outer surface of the body, a push rod extending from the push button into the pressure compartment through a bore in the body wall, said push rod having a resilient valve body at the end thereof that extends into the pressure compartment, and spring means for urging said push button and said push rod toward a closed position of said relief valve, a communicating passage being provided adjacent to the bore which receives said push rod, which communicating passage is opened or closed by said resilient valve body to control the relief valve, wherein when said push button is pushed inwardly toward the body, said relief valve is opened as well as said combined check and release valve unit, whereby air enclosed within the air bag is communicated with the atmosphere.

The drawings are being presented for better illustration of the invention and not for limitation thereof.

DETAILED DESCRIPTION OF THE INVENTION

Figure 1:
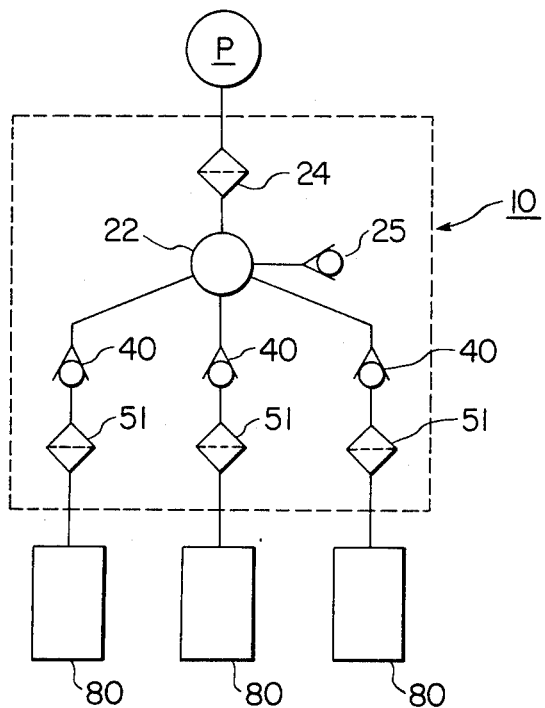
FIG. 1 is a diagram showing how the air lines of the air bag control valve assembly of the present invention are connected to a source of air pressure and to a number of air bags.

An embodiment of the present invention will now be described with reference to the accompanying drawings. To facilitate the explanation of the inventive valve assembly for air bag control, reference will first be had to FIG. 1 to describe the connections among the various components that constitute the valve assembly, designated at numeral 10, a source of air pressure P, and individual air bags 80. The air pressure source P, which may comprise a mechanically or manually operated pump or the like, is adapted to deliver pressurized air to the pressure compartment 22 following filtration of the air accomplished by passage through a filter 24 disposed within the valve assembly 10. The pressure compartment 22 is connected to a safety valve 25 which protects the other assembly components be releasing air from the pressure compartment 22 when the pressure prevailing therein exceeds a prescribed value, and to combined check and release valve units ("combined check and release valve" hereinafter) 40 for supplying the respective air bags 80 with air for inflation, and for discharging any excess air. A filter 51 is provided in each line connecting the combined check and release valve 40 with the corresponding air bag 80. Each combined check and release valve 40 ordinarily operates to check a return flow of air from the corresponding inflated air bag 80 to the pressure compartment 22. However, when a push button 61 to be described below is depressed to adjust the contour of the seat surface, the air enclosed within the air bag 80 is expelled into the pressure compartment 22 through the valve 40 to deflate the air bag.

The construction of the valve assembly 10 of the present invention will be described in greater detail with reference to FIGS. 2 through 4. The valve assembly 10 comprises an upper body 20, a lower body integrally attached to the bottom part of the upper body 20 by means of screws 31, a plurality (three in the drawings) of combined check and release valves 40 attached to the lower part of the lower body 30 by means of screws 41, and push button mechanisms 60 attached to the upper part of the upper body to oppose the valves 40.

The upper body 20 includes a flange 21 around its periphery to facilitate mounting to the car body (not shown), and cooperates with the lower body 30 to define a single cavity which serves as the pressure compartment 22. An inlet tube 23 having an inlet 28 therein which projects from the side of the upper body 20, is connected at its other end to the source of air pressure P to communicate the source P with the pressure compartment 22, as shown in FIG. 4. Thus the inlet 28 introduces air from the source P to the pressure compartment 22 through the filter 24. Also projecting from the side of the upper body 20 is an outlet tube 26 of a diameter greater than that of the inlet tube 23. The outlet tube 26 having an outlet 29 accommodates the aforementioned safety valve 25 therein, the latter being of a well-known construction.

Each combined check and release valve 40 attached air-tightly to the lower part of the lower body 30 comprises a cylindrical portion 42 and a tube 43 which extends diagonally downward from the side of the cylindrical portion 42 at the lower end thereof, the tube 43 being connected to the corresponding air bag 80 through a hose, which is not shown. Provided within the cylindrical portion 42 at the upper part thereof are a resilient valve body 44 and a skirt 45, both of which are penetrated by a rod 46. The upper portion of the rod 46 has a cross-shaped transverse cross-section and extends upwardly into the pressure compartment 22 through a communicating hole 27 located at the lower portion thereof. The skirt 45 is normally urged upwardly by a spring 48 provided between the skirt 45 and a ring 47 having a stepped inner profile. The resilient valve body 44 therefore keeps the communicating hole 27 closed under normal conditions. However, when the air fed into the pressure compartment 22 to inflate the air bags 80 causes the compartment pressure to exceed a certain value, or when the push-button mechanism 60 located above the combined check and release valve 40 is depressed, the rod 46 and resilient valve body 44 will be urged downwardly against the force of the spring 48 to allow a flow of air from the pressure compartment 22 into the air bag 80 to inflate the same in the former case, or from the air bag 80 into the pressure compartment 22 to deflate the air bag in the latter case, the air being allowed to flow around the downwardly displaced valve body 44 and through gaps which are formed between the wall of the communicating hole 27 and the rod 46 owing to the cross-shaped configuration of the end of the rod.

Further provided in the lower part of the cylindrical portion 42 of the combined check and release valve 40 are a plug 49 having a sleeve 50, and a filter 51 retained between the stepped ring 47 and the sleeve 50. The filter 51 serves to filter out dust from the air which passes between the pressure compartment 22 and the air bag 80. The plug 49 is retained air-tightly within the cylindrical portion 42 by an O-ring 52, and its sleeve 50 is provided with an air flow-through 53 so that air may flow between the pressure compartment 22 and air bags 80 via the tube 43 and communicating hole.

The push-button mechanism 60, provided on the upper body 20 to oppose each combined check and release valve 40 as described above, comprises a disk-shaped push button 61, a push rod 62 which extends downwardly from the push button 61 through a bore 65 formed in the upper body 20, and which is arranged coaxially with respect to the rod 46 of the valve 40, and a spring 63 for upwardly biasing the push rod 62 and push button 61. A cover 64, with holes through which the push buttons 61 are passed, is attached to the upper part of the upper body 20 for restricting the extent to which the push-buttons are projected by the springs 63.

The bore 65 in the upper body 20 that is penetrated by the push rod 62 has a diameter which is slightly larger than that of the rod 62 so that a small gap is formed between the wall of the bore 65 and the outer periphery of the push rod. The gap serves to gradually release pressurized air which has been introduced into the pressure compartment 22.

Pressurized air which has been delivered from the air pressure source P in the manner described above in order to inflate the air bags 80 enters the pressure compartment 22 and then is fed to the air bags 80 through the corresponding combined check and release valves 40. A portion of the air delivered to the pressure compartment 22 is released into the atmosphere via the gap formed between the wall of the bore 65 and the outer periphery of the push rod 62. The remainder of the air in the pressure compartment is fed into the air bags 80 through the valves 40 until the bags are fully inflated, at which time the supply of air is terminated. If the seated individual finds the seat contour to be uncomfortable, he depresses the appropriate push button 61 to discharge the excess air from the associated air bag 80, thereby partially deflating the air bag to adjust the contour of the seat. Since the push rod 62 pushes the rod 46 of the combined check and release valve 40 downwardly when the push button 61 is depressed, the air previously fed into the air bag 80 flows backwardly into the pressure compartment 22 from the now open valve 40 and is then released from the pressure compartment into the atmosphere via the gap between the wall of the bore 65 and the outer periphery of the push rod 62, the air escaping from around the periphery of the push button 61. The system is air tight from each combined check and release valve 40 to the associated air bag 80 so that an inflated air bag will remain inflated for several days.

According to the construction of the air bag control valve assembly of the present invention, an overall reduction in size is achieved by combining a relief valve and check valve into a single valve 40, and by integrating into a unitary structure the valve components which have been connected by a number of joints in the prior art. This is accompanied by a reduction in the number of joints and valves to enhance the air-tightness of the air bags and hence minimize leakage, to reduce the amount of space needed for mounting to the vehicle body, and to simplify piping. Moreover, installing the filters in the valve assembly prevents clogging due to dust and thus enhances both the air-tightness and reliability of the valve assembly.

Figure 2:
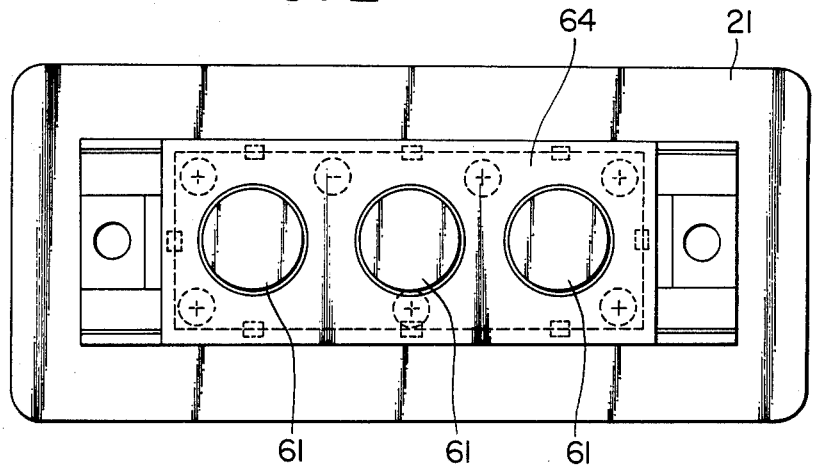
FIG. 2 is a top plan view showing the air bag control valve assembly.
Figure 3:
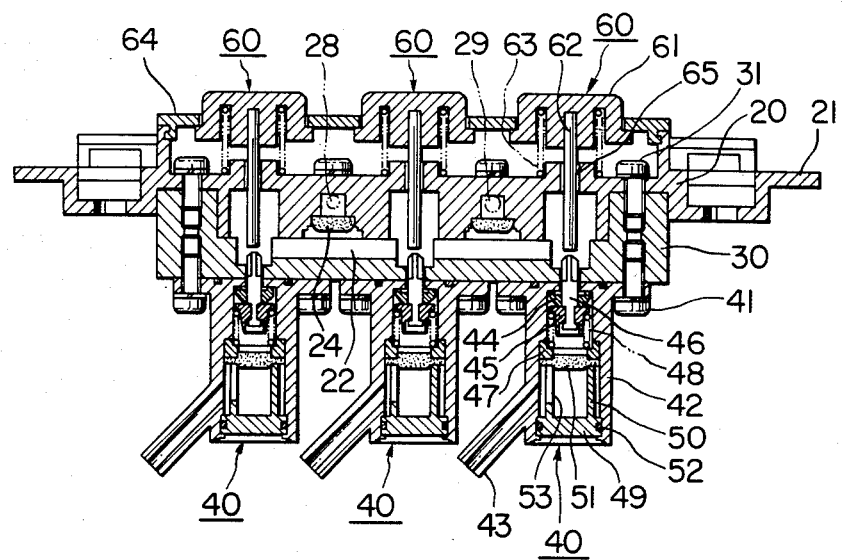
FIG. 3 is a sectional view illustrating the air bag control valve assembly according to the present invention.
Figure 4:
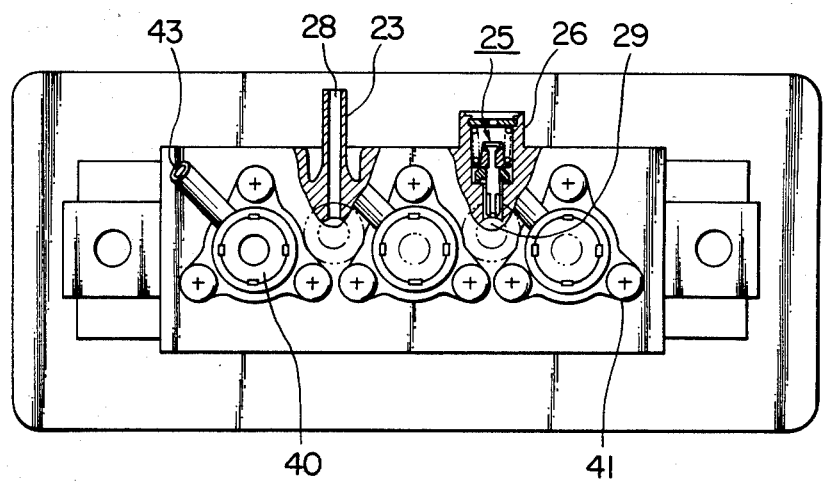
FIG. 4 is a bottom plan view, partially in section, showing an air bag control valve assembly.
Figure 5:
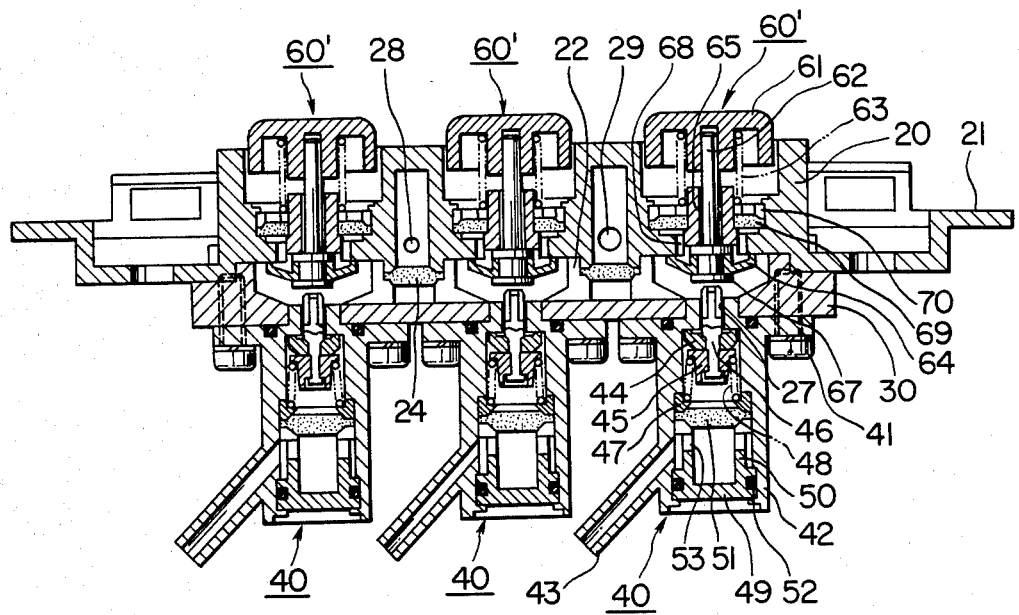
FIG. 5 is a sectional view showing an alternative embodiment of the valve assembly according to the present invention.

Another embodiment of the valve assembly for air bag control shown in FIG. 5 is substantially identical with the embodiment shown in FIGS. 2 to 4 except that a push-button mechanism 60' is combined with a relief valve. Like reference characters designate corresponding parts in the drawings.

The combined relief valve and push-button mechanism 60', provided on the upper body 20 to oppose each combined check and release valve 40 as described above, comprises a disk-shaped push button 61, a push rod 62 which extends downwardly from the push button 61 through a bore 67 formed therein, and which is arranged coaxially with respect to the rod 46 of the combined check and release valve 40, and a spring 63 for upwardly biasing the push rod 62 and push button 61. The push button 61 projects slightly from the upper surface of the upper body 20. Attached to the lower end of the push rod 62 is a valve guard 67 for securing an annular resilient valve element 64. The arrangement is such that rod 46 of the combined check and release valve 40 is located directly below the valve guard 67. A communicating passage 68 is formed in the upper body 21 around the bore 65 which receives the push rod 62. The resilient valve element 64 is urged upwardly together with the push button 61 and push rod 62 by means of a spring 63, thereby keeping the communicating passage 68 closed to the pressure compartment 22 under normal conditions. The communicating passage 68 communicates with an annular communicating passage 70 which is located below the recess that is formed in the upper body 20 to accommodate the push button 61, and which retains an annular filter 69.

In the operation of the above valve assembly constructed in accordance with the present invention, assume that air has been fed into the air bags 80 from the source P through the combined check and release valves 40 in the manner mentioned hereinabove, and that the push button 61 of one of the combined relief valve and push-button mechanisms 60 is then depressed. This will cause the valve guard 67 at the lower end of the push rod 62 to push the corresponding rod 46 of the combined check and release valve 40 downwardly, permitting the pressurized air to flow backwardly from the associated air bag 80 into the pressure compartment 22 through the now open the combined check and release valve 40. Since the resilient valve body 64 has been downwardly displaced at the end of the depressed push rod 62, the pressurized air expelled into the pressure chamber 22 from the air bag 80 via the opened combined check and release valve 40 flows through the communicating passage 68, filter 69 and communicating passage 70 from which the air is released into the atmosphere by passing along the side surface of the push button 61. The air is thus vented from the air bag 80, causing deflation of the air bag so that the contour of the seat in which the air bag is installed can be adjusted by holding the push button 61 depressed as long as required.

According to the construction of the air bag control valve assembly of this embodiment, the push-button mechanism 60 which operates the combined check and release valve 40 serves also as a relief valve to permit release of the air expelled into the pressure compartment 22 from the air bag. Such an arrangement enhances the air-tightness of the pressure compartment 22 and improves the efficiency with which air is fed into the air bags. Moreover, installing the filter 69 in the relief valve portion of the mechanism 60 prevents dust from entering the pressure compartment 22 from the gap around the outside of the push button 61, assuring that the moving parts within the assembly will operate smoothly without being clogged with dust. In addition, so effective is the filter 69 in removing dust that the communicating passage 68 can be enlarged in diameter to permit rapid deflation of the air bags, enabling the individual to adjust the air bags in a very short period of time.

What is claimed is:

1. An air bag control valve assembly for individually inflating a plurality of air bags, comprising:
   an integrally assembled body in which a pressure compartment is formed,
   an inlet for connecting the pressure compartment to a source of air pressure,
   a relief valve for releasing air from the pressure compartment, and
   a plurality of combined check and release valve units for connecting and disconnecting the pressure compartment to each of the air bags through a communicating hole, each of said valve units being retained with a rod extending into the communicating hole so as to be guided therein, one end of the rod projecting into the pressure compartment at a closed position of said valve units, the rod having a cutout portion extending substantially from the middle of the rod up to said one end and the valve unit being spring-biased toward a normal closing position,
   said relief valve and said combined check and release valve units being attached to the interior of said body,
   said relief valve comprising a pushbutton projecting from the outer surface of the body, a push rod extending from the pushbutton into the pressure compartment through a hole in a wall of the body, said push rod being coaxially arranged with respect to said rod of the combined check and release valve unit and having a resilient valve element at the end thereof that extends into the pressure compartment, and spring means for urging said pushbutton and said push rod to a position which allows said relief valve to be normally closed,
   a communicating passage provided adjacent to the bore which receives said push rod, the communicating passage is opened or closed by said resilient valve element to control the relief valve,
   wherein when said pushbutton is pushed inwardly toward the body, said relief valve is opened as well as said combined check and release valve unit by the rod of said combined check and release valve unit being actuated to open the valve unit, whereby air enclosed within the air bag is adjustably discharged to the atmosphere through the cutout in the rod.

2. An assembly as defined in claim 1, wherein a filter is provided on the air bag side within said combined and release valve unit.

3. An assembly as defined in claim 1, wherein a filter is provided on the atmospheric side of said communicating passage for the relief valve.

4. An assembly as defined in claim 1, wherein a filter is provided between said pressure compartment and said inlet.

5. An assembly as defined in claim 1, wherein a safety valve is provided for releasing air from the pressure compartment to the atmosphere.

* * * * *